United States Patent
Harris et al.

(10) Patent No.: US 6,393,653 B1
(45) Date of Patent: May 28, 2002

(54) WINDSHIELD WIPER INERTIA ABSORPTION APPARATUS AND METHOD

(75) Inventors: Daryl G. Harris, Auburn Hills, MI (US); Robert K. Arao, Saiport, NY (US); Thomas A. Gibson, Allentown, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/443,675

(22) Filed: Nov. 19, 1999

(51) Int. Cl.⁷ .............................. B60S 1/18; B60S 1/16
(52) U.S. Cl. ...................... 15/250.3; 15/250.27; 74/42; 74/43
(58) Field of Search .............. 15/250.3, 250.27, 15/250.31, 250.16, 250.15; 74/42, 43

(56) References Cited

U.S. PATENT DOCUMENTS

| | | | |
|---|---|---|---|
| 2,744,282 A | * 5/1956 | Dyer et al. | ................ 15/250.3 |
| 4,765,018 A | 8/1988 | Buchanan, Jr. | |
| 5,050,442 A | 9/1991 | Reed | |
| 5,226,200 A | 7/1993 | Buchanan, Jr. et al. | |
| 5,388,482 A | 2/1995 | Jones et al. | |
| 5,465,636 A | 11/1995 | Jones et al. | |
| 5,506,483 A | 4/1996 | McCann et al. | |
| 5,507,585 A | 4/1996 | Diederich et al. | |
| 5,642,026 A | 6/1997 | McCann et al. | |
| 5,654,616 A | 8/1997 | Suriano et al. | |
| 6,105,199 A | * 8/2000 | Inkura | ................ 15/250.3 |

FOREIGN PATENT DOCUMENTS

| | | | | |
|---|---|---|---|---|
| DE | 3826506 | * | 2/1990 | ............... 15/250.3 |
| DE | 4323551 | * | 1/1994 | ............... 15/250.3 |
| JP | 64051 | * | 4/1985 | ............... 15/250.3 |
| SU | 943038 | * | 7/1982 | ............. 15/250.27 |
| SU | 1142325 | * | 2/1985 | ............... 15/250.3 |

* cited by examiner

*Primary Examiner*—Gary K. Graham
(74) *Attorney, Agent, or Firm*—J. Gordon Lewis

(57) ABSTRACT

A windshield wiper apparatus for a vehicle includes an energy absorption member coupled between the moving drive arm and stationary structure which provides an opposing force to the movement of the wiper arm to absorb a portion of the inertial energy of the wiper arm as the wiper arm approaches one of at least an outwipe end limit and an inwipe end limit of a wipe pattern to reduce the impact forces on the wiper apparatus at the point of reversal of the wiper arm. The energy absorption member is in the form of a spring or compressive member arranged to store energy during movement of the wiper arm toward one or both of the end limits and to release the stored energy back to the wiper apparatus as the wiper arm reverses direction at each end limit. The energy absorption member is actively coupled to the drive arm only during a predetermined angular portion of the angular rotation of the drive arm which coincides with the region of increased mechanical advantage in the drive linkage.

20 Claims, 4 Drawing Sheets

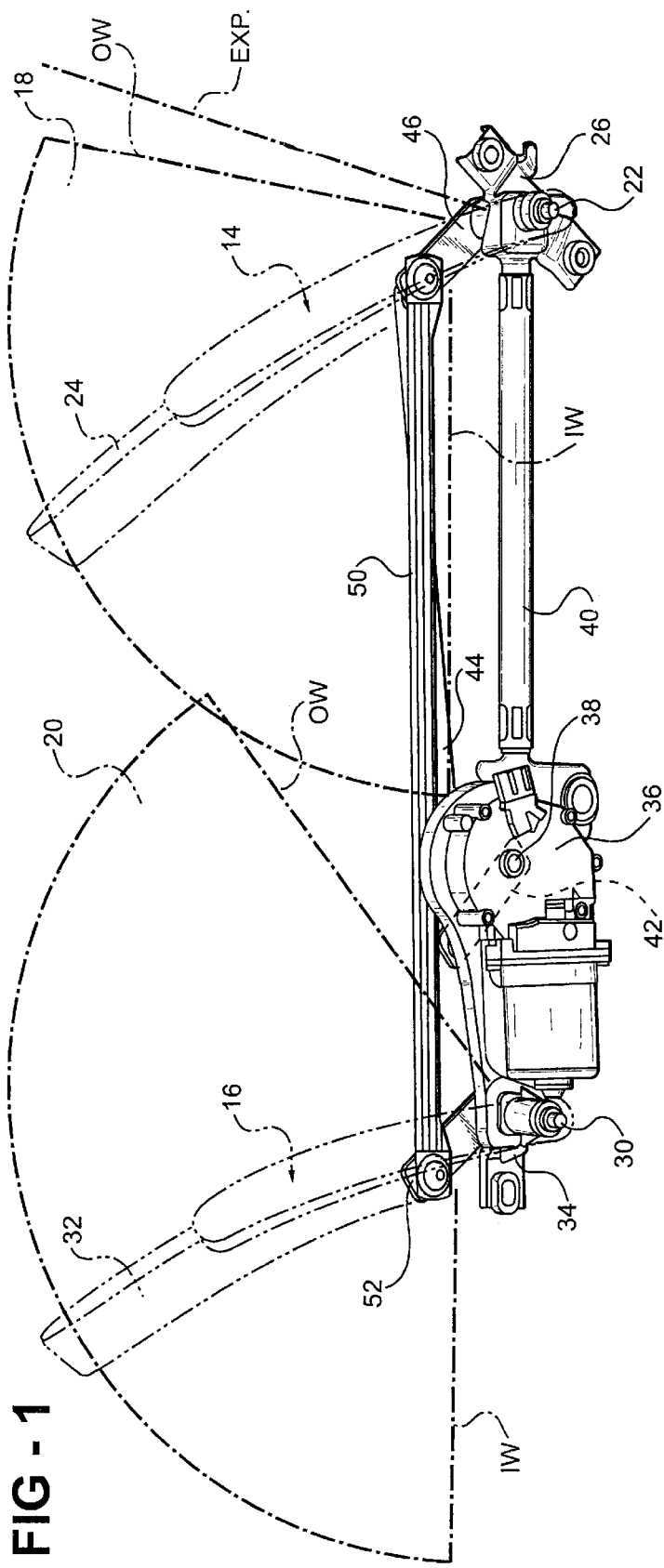
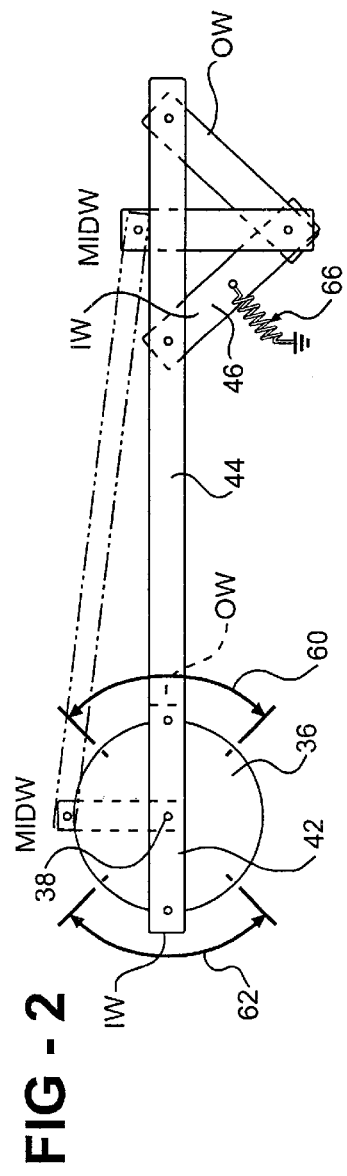
FIG - 1
FIG - 2

WINDSHIELD WIPER INERTIA ABSORPTION APPARATUS AND METHOD

BACKGROUND OF THE INVENTION

1. Field of the Invention

The present invention relates, in general, to vehicle windshield wiper systems and, more specifically, to control of the wipe pattern at extreme end limits of wiper travel.

2. Description of the Art

Vehicle windshield wiper systems of the type in which the windshield wiper blade direction is reversed, for example, tandem, symmetrical overlap, single arm, single extending arm, etc., are widely known and are included as standard equipment on nearly every motor vehicle. Such windshield wiper systems typically include a dual speed drive motor that continuously rotates a crank arm. In order to translate the continuous rotation of the crank arm into the back and forth or oscillating sweeping action needed in a wiper, a linkage, such as a four bar linkage, connects the crank arm to the wiper arm.

The wiper arm is oscillated back and forth between inner and outer end wipe limits determined by the dimensions of the links of the various arms of the linkage, often with a large mechanical advantage at certain portions of the 360° rotation cycle of the crank arm. The inwipe and outwipe end limits of travel define the wipe pattern as the wiper operates.

Maintenance of a constant wiper speed or even an acceleration through the reversal points where the wiper arm and blade direction is reversed at the inwipe and outwipe end limits, produces several undesirable effects, including wipe pattern or angle growth, increased production of noise, and wear on the windshield wiper drive linkage and wiper arms, particularly at high speed motor operation. During such high speed motor operation, the wiper arm tends to travel past a nominal reversal point at least at the outwipe end limit, thus increasing the wipe angle or pattern, at least at the outwipe position. When the wiper arm and blade travel past the nominal outwipe limit to an extent that the wiper arm and blade contact a windshield pillar, the resulting "slap" or contact produces undesirable noise. This impact loading also has an adverse effect on the motor and linkage.

Although such noise is not necessarily a safety concern, the undesirable noise at high speed wiper arm operation adversely impacts customer perception of the quantity of the vehicle and/or the vehicle wiper system. Such perception is also impacted by the variability between the wipe pattern during low and high speed wiper motor operations.

Research in the development of vehicle windshield wiper systems shows that the inertial tendency of the wiper arm to keep moving in the direction that it is sweeping becomes a very significant contributing force to wipe pattern extension, particularly at high motor operating speeds.

Windshield wiper systems are known in which the wiper position is sensed and a switching mechanism employed to slow the motor just prior to the reversal of the blade and arm directions at the inner and outer end wipe positions. In such systems, even though the wiper motor is normally operated at a high speed for the most of the wipe pattern or sweep, as the wiper arm and blade approach the inwipe or outwipe end limits, the switching circuit switches the motor to a low speed to provide a soft wipe mode at the inwipe and outwipe reversal points.

However, it is believed that it would be desirable to provide an improved windshield wiper system which is capable of minimizing wipe pattern expansion, especially under high speed wiper motor operation. It would also be desirable to provide an energy absorption apparatus for minimizing wiper pattern expansion which can be adapted for use in many different windshield wiper arrangements.

SUMMARY OF THE INVENTION

The present invention is an apparatus and method for absorbing a portion of the inertial energy of a moving wiper in a windshield wiper apparatus as the wiper arm approaches and moves away from one of the inwipe and outwipe end limits of travel in the wipe pattern.

In one aspect of the invention, a windshield wiper apparatus for a vehicle comprises:

a pivot housing fixed to the vehicle;

a pivot shaft carried within the pivot housing and capable of rotation about the longitudinal axis over a predetermined angle defining a wipe pattern;

a wiper arm rotatably mounted on the pivot shaft and movable in the wipe pattern between an inwipe end limit and an outwipe end limit;

a drive motor having a drive shaft rotatable about a drive axis;

a crank arm coupled to the motor drive shaft at one end for rotation with the motor drive shaft;

a drive link having a first end pivotally connected to a drive arm and a second end coupled to the crank arm for bidirectional oscillation upon rotation of the crank arm, the drive arm fixedly connected at one end to the pivot shaft for bidirectional rotation of the pivot shaft upon oscillation of the drive link; and energy absorption means, coupled to the drive arm, for storing a portion of the inertial energy of the wiper arm as the wiper arm moves toward at least one of the inwipe end limit and the outwipe end limit.

In one aspect of the invention, the energy storage means also releases the stored energy to the wiper arm, the drive arm and the drive link as the wiper arm begins movement from the one end limit toward the other end limit.

In another aspect of the invention, the energy absorption means is a spring connected between the drive arm and stationary vehicle structure, such as the pivot housing, for storing energy as the wiper arm approaches at least one of the inwipe and the outwipe end limits.

In a specific aspect, the spring is an extension spring which extends to store energy as the wiper arm approaches one of the end limits.

In another aspect, the spring is a coil tension spring concentrically mounted about the pivot housing and having opposed ends connected to the drive arm and to stationary structure, respectively.

In yet another aspect, the spring is a leaf spring fixed at a first end to the drive arm and having a flexible second end extending from the first end. A projection extends from the pivot housing and engages and flexes the second end of the leaf spring during movement of the drive arm to store energy in the leaf spring.

In yet another aspect of the invention, the energy absorption means is a resilient, compressive member carried on the pivot housing and engagable with a flange on the drive arm so as to be compressed during movement of the drive arm toward one of the end limits of travel.

The energy absorption means is unidirectionally operative upon movement of the wiper arm toward one of the inwipe and outwipe end limits of travel. The energy absorption means can also be devised for bidirectional operation at each of the inwipe and the outwipe end limits.

In one aspect, the energy absorption means is devised to begin providing an opposed force and absorbing inertial energy from the wiper arm at the point in the angular travel of the drive arm which coincides with the significant ramp up or increase in the mechanical advantage in the wiper linkage on the drive arm. In this aspect, one end of the spring is movably disposed in a slot in a flange on the pivot housing. While one end of the spring moves from one end to the other end of the slot, the spring is unable to store of energy during a portion of the travel of the wiper arm across the wipe pattern. However, the engagement of one end of the spring with one end of the slot which coincides with the start of the mechanical advantage area, enables the spring to begin to store energy.

In another aspect of the invention, a method of storing inertial energy during a portion of the wipe pattern of a wiper arm in a vehicle windshield wiper apparatus is disclosed.

In this aspect of the invention, the method includes the step of coupling an energy absorption means between the drive arm and a stationary element for storing a portion of the inertial energy of the moving wiper arm as the wiper arm moves approaches at least one of the inwipe end limit and the outwipe end limit.

In another aspect of this method, the energy absorption means is also devised for releasing energy back to the drive arm after the wiper arm reverses its direction of travel at one of the outwipe or inwipe end limits.

In yet another aspect of the inventive method, the method includes the step of connecting the energy absorption means for unidirectional operation at only one of the inwipe and outwipe end limits. Alternately, the energy absorption means is connected for bidirectional operation in storing inertial energy as the wiper arm approaches each of the inwipe and outwipe end limits.

The present inventive apparatus and method provides a means for minimizing expansion of the wipe pattern in a vehicle windshield wiper apparatus, particularly at a high speed wiper motor operation, or reducing the outwipe angle difference between low speed and high speed wiper motor operation. In the present invention, an energy absorption means is connected between a fixed, stationary part of the wiper apparatus or the vehicle and the movable drive arm for presenting an opposing force capable of storing or diverting a portion of the inertial energy of the wiper arm as the wiper arm approaches one of the end limits of travel in the wipe pattern. This stored energy is subsequently returned to the drive arm to assist in accelerating the drive arm after the wiper arm reverses direction at one of the end limits of travel in the wipe pattern.

The unique energy absorption means of the present invention reduces noise caused by reversal of the wiper arm at the outwipe position where the wipe pattern has been extended at the outwipe position due to increased inertial energy of the wiper arm at high speed motor operation. The energy absorption means of the present invention also reduces impact loading on the motor and the entire wiper linkage by reducing acceleration of the wiper arm and linkage going into wiper arm reversal at the end limits of the wipe pattern.

BRIEF DESCRIPTION OF THE DRAWING

The various features, advantages and other uses of the present invention will become more apparent by referring to the following detailed description and drawing in which:

FIG. 1 is a perspective view of a wiper assembly in which an inertial energy absorption apparatus according to the present invention can be employed;

FIG. 2 is a pictorial representation showing the theoretical operation of the inertial energy absorption apparatus of the present invention;

DESCRIPTION OF THE PREFERRED EMBODIMENTS

Figure 3:
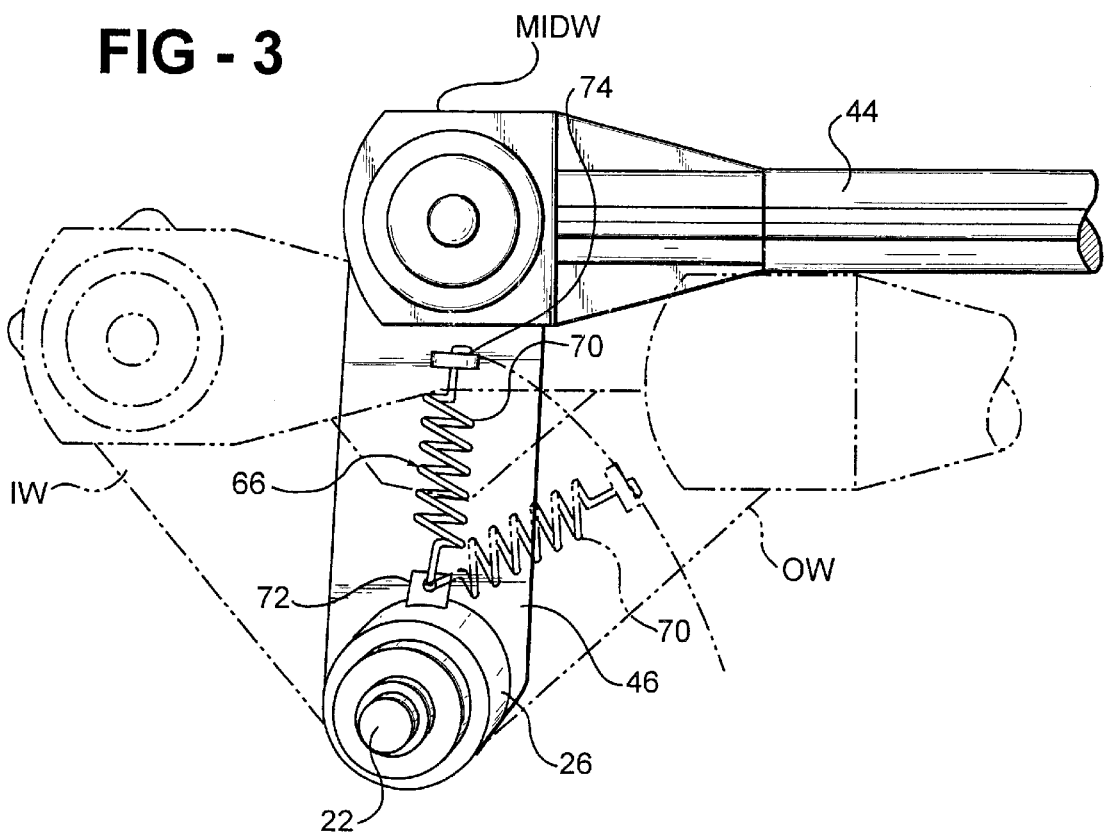
FIG. 3 is a rear elevational view of a first aspect of the inertial energy absorption apparatus employed with the wiper assembly shown in FIG. 1.
Figure 4:
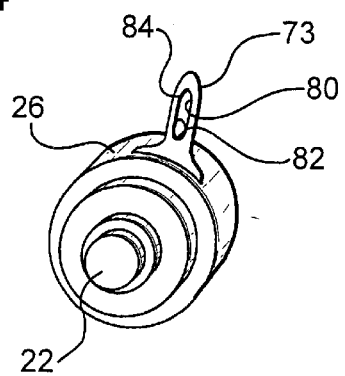
FIG. 4 is a rear elevational view a modification to the first aspect of the inventive apparatus shown in FIG. 3.

For clarity in understanding the features and advantages of the present invention, a typical windshield wiper system 10 is illustrated in FIG. 1 and will be described hereafter by way of example only. The wiper system 10 shown in FIG. 1 is a tandem blade system. The present invention, however, is equally applicable to symmetrical overlap, single arm and single extending arm windshield wiper configurations.

The wiper assembly 10 includes a pair of wiper arms 14 and 16, with wiper arm 14 generally movable in a wiper pattern 18 between an inwipe (IW) end limit of travel and an outwipe (OW) end limit of travel generally in front of the vehicle driver. The wiper arm 16 is likewise movable between an inwipe (IW) end limit of travel and an outwipe (OW) end limit of travel which define therebetween a front passenger side wipe pattern 20.

The wiper arm 14 has a first end fixedly mounted on a first pivot shaft 22 which defines a pivot axis about which the wiper arm 14 rotates. The wiper arm 14 has a blade 24 at a second end for reciprocation or oscillating, sweeping movement across the windshield in the wipe pattern 18 between the inwipe and outwipe end limits.

The pivot shaft 22 is rotatably mounted within a pivot housing 26 which includes suitable mounting apertures for fasteners for rigid attachment to vehicle body structure, typically within the cowl portion of the vehicle.

A second pivot shaft 30 is fixed to one end of the wiper arm 16 which also has wiper blade 32 at a second end which reciprocates in an oscillating, sweeping movement defined by the wipe pattern 20 between the inwipe and outwipe end limits of travel.

The pivot shaft 30 is rotatably mounted within a pivot housing which is also attachable to stationary vehicle body structure. The housing 34 is also designed to provide a mount for a dual speed electric motor 36. The motor 36 has an output shaft 38 projecting from one side thereof.

The pivot housing 26 is rigidly joined to the pivot housing 34 by an elongated frame tube 40 which is connected to tubular portions extending from the pivot housing 26 and the pivot housing 34.

In FIG. 1, the windshield wiper system 10 is shown in a midwipe position for clarity in viewing all of the operative elements of the wiper system 10.

A crank arm 42 is fixed at one end about the output shaft 38 of the motor 36 and is rotatable in a full 360° arc upon energization of the motor 36. The crank arm 42 is pivotally connected at an opposite end to one end of an elongated drive link 44. The opposite end of the drive link 44 is pivotally connected to a drive arm 46, the opposite end of which is fixed to the pivot shaft 22. In this manner, 360° rotation of the crank arm 42 upon energization and rotation of the motor 36 output shaft 38 is transmitted by the drive link 44 to pivotal movement of the drive arm 46 and the pivot shaft 22. This pivotal movement is through an arc defining the wipe pattern 18 of the wiper arm 14 between the inwipe (IW) end limit of travel and the outwipe (OW) end limit of travel.

A wiper operating link or slave link 50 is pivotally connected at one end to one end of the drive arm 46 and at an opposite end to a pivotal connection at one end of a slave arm 52. The opposite end of the slave link 50 is pivotally connected to a slave arm 52 which is fixedly mounted at an opposite end to the pivot shaft 30 to pivot the pivot shaft 30 upon oscillation of the slave link 50 and the slave arm 52.

In this manner, back and forth pivotal movement of the drive arm 46, as described above, is transmitted through the slave link 50 to back and forth pivotal movement of the slave arm 52 and the pivot shaft 30 to rotate the wiper arm 16 through the wipe pattern 20 simultaneous with rotation of the wiper arm 14 through its wipe patter 18.

The conversion of rotational movement of the crank arm 42 to sweeping, oscillatory movement of the drive arm 46 is shown diagrammatically in FIG. 2. In FIG. 2, a rear view of the motor 36, the motor output shaft 38, the crank arm 42, the drive link 44, and the drive arm 46 are shown in solid at the inwipe position, with the crank arm 42, drive link 44 and drive arm 46 depicted in phantom at the midwife and outwipe positions.

Regions 60 and 62 in the 360° rotation of the crank arm 42 respectively show mechanical advantage areas wherein a given amount of angular displacement of the crank arm 42 results in a much smaller angular displacement of the drive arm 46. That is, at the beginning of each region 60 and 62 as the crank arm 42 rotates clockwise with the output shaft 38, the mechanical advantage and, thereby, the angular acceleration and the inertial energy of the wiper arms 14 and 16 begins to significantly increase, rising to a peak at the center point of each region 60 and 62, coinciding with the reversal point of the direction of travel of the wiper blades 14 and 16, and then decreasing to the end of the region 60 and 62. Regions of rotation of the crank arm 42 between the angular regions 60 and 62 are rotational positions with less mechanical advantage. It is during rotational movement of the crank arm 42 through the regions 60 and 62 that rotational movement of the drive arm 46, the slave arm 52 and the wiper arms 14 and 16 generate the most inertial energy, with the maximum inertial energy being generated as the wiper arms 14 and 16 approach the inwipe and outwipe positions which coincide with the center points of the regions 60 and 62, respectively.

The present invention provides an inertial energy absorption means denoted by reference number 66 in FIG. 2 which absorbs or diverts a portion of the inertial energy of the moving wiper arms 14 and 16 and the associated linkage, particularly in the region of the outwipe end limit and/or inwipe end limit of travel of the wiper arms 14 and 16. As described hereafter, the energy absorption means 66 may also be operative to absorb energy as the wiper arm 14 approaches either the inwipe end limit or the outwipe end limit of travel.

It will also be understood that the energy absorption means 66 is described hereafter as being coupled to the drive arm 46 rather than the slave arm 52. This is due to the fact that it has been found that the connection of the energy absorption means to the drive arm 46 provides maximum inertial energy absorption as compared to an arrangement where the energy absorption means is coupled to the slave arm 52. However, it will be understood that a connection to the slave arm 52 is also possible in the present invention.

In a general aspect, the energy absorption means 66 is dimensioned and positioned to absorb or divert a portion of the inertial energy of the wiper arms 14 and 16 and the entire wiper linkage as the wiper arms 14 and 16 approach the one end limit of travel which energy is greater than inherent stiffness or rigidity of the wiper linkage to wipe pattern growth or extension. Thus, the energy absorption means 66 is designed to come into operation at high inertial energy levers of the wiper arms 14 and 16 which occurs when the wiper arms 14 and 16 approach either end limit, and primarily at high speed wiper motor speeds; although there is some energy absorption at low motor speeds. Since the energy absorption means 66 is designed to start storing or diverting a portion of the inertial energy during the beginning part of the maximum mechanical advantage regions 60 and 62, the stored energy can in turn be re-released back to the drive arm 46 and the entire wiper assembly linkage after the wiper arms 14 and 16 reverses direction and begins travel from one end limit toward the other end limit.

The energy absorption means 66 applies an increasing opposed load or force to the drive arm 46 to counter the increasing mechanical advantage of the wiper drive linkage in the regions 60 and 62 and the increasing inertial energy of the wiper arms 14 and 16. This opposing force is applied in an increasing manner as the mechanical advantage of the linkage and the inertial energy of the wiper arms 14 and 16 increase from the start of each region 60 and 62 up to the midpoint or center of each region 60 and 62. This stored opposing force is reapplied to the drive arm 46 during the remainder of each region 60.

Examples of the energy absorption means 66 of the present invention will now be described in several embodiments shown in FIGS. 3–8.

In FIG. 3, the drive arm 46 is illustrated in three positions, namely, an outwipe position in phantom, a midwipe position in solid, and an inwipe or park position, also in phantom. In each position, the position of the end of the drive link 44 coupled to one end of the drive arm 46 is also depicted.

In this aspect of the invention, the energy absorption means is in the form of a pull or extension spring 70. A first end of the spring 70 is connected to stationary vehicle or wiper structure, such as a bracket on the vehicle or the vehicle cowl, or a stationary part of the wiper apparatus which is fixed to the vehicle. In an example only, one end of the spring 70 is connected to a tab 72 joined to or formed on the pivot housing 26. The other end of the spring 70 is fixedly joined to a tab or projection or even an aperture 74 on the drive arm 46. The spring 70, is designed to be in a neutral spring force position when the drive arm 46 is in the midwipe position shown in solid in FIG. 3.

During travel of the drive arm 46 from the midwipe to the outwipe position, the spring 70 is subjected to an outward pulling or tensile force since one end of the spring 70 is rotating about the projection 72 on the pivot housing 26; while the opposite end of the spring 70 connected to the projection or aperture 74 on the drive arm 46 is rotating with the drive arm 46 about the pivot axis of the pivot shaft 22. This causes an elongation of the spring 70 and a buildup of energy within the spring 70 equal to an absorption or diversion of a portion of the inertial energy of the moving drive arm 46, drive link 44, and wiper arm 14. By reducing the inertial energy of the moving wiper arm 14, expansion of the wipe pattern 18, as shown in FIG. 1, beyond the outwipe position is minimized. This also allows reversal of the wiper arm 14 at the outwipe end limit to be more smooth and with less noise or impact on the linkage of the wiper assembly 10. In addition, since a certain amount of force has been opposed or absorbed by the spring 70 as the drive arm 46 reaches the outwipe end limit shown in phantom in FIG. 3, the energy can be reapplied to the drive arm 46 and thereby to the pivot shaft 22 and the wiper arm 14 after reversal of the direction of travel of the wiper arm 14 toward the inwipe end limit to assist in accelerating the drive arm 46 in the opposite direction.

The spring force of the energy absorption means 66, such as the spring 70, is preferably selected to be greater than the inherent stiffness or rigidity of the wiper apparatus. In this way, the energy absorption means 66 is operative only when the inertial energy of the wiper apparatus exceeds the stiffness or rigidity of the wiper apparatus in opposing wiper travel extension beyond the end limits of travel.

During movement of the wiper arm 14 toward the inwipe end limit, the spring 70 contracts in length through the midwipe position shown in solid in FIG. 3 and then begins elongating again due to the different centers of rotation of the first and second ends of the spring 70 until the drive arm 46 reaches the inwipe or park position also shown in phantom in FIG. 3. Thus, in this aspect of the invention, the spring 70 is also capable of absorbing a portion of the inertial energy of the moving wiper arm 14 as the wiper arm 14 also approaches the inwipe position. This stored inertial energy in the elongated spring 70 is again reapplied to movement of the drive arm 46 and the wiper arm 14 after reversal of the travel direction of the wiper arm 14 at the inwipe end limit of travel.

It should be noted that the maximum elongation of the spring 70 occurs when the drive arm 46 reaches the outwipe position or the inwipe position shown in FIG. 3, which corresponds to the center of the maximum mechanical advantage regions 62 and 60 shown in FIG. 2.

As shown in FIG. 3, the connection of the spring 70 between the tab 74 and the tab 72 results in the beginning of elongation of the spring 70 and start of energy absorption by the spring 70 immediately as the spring 70 moves from the neutral spring force condition at the midwipe position of the drive arm 46 in either direction to the outwipe or inwipe end limit. However, as it is preferred that the energy absorption means 66, such as the spring 70 in this aspect of the invention, actually begin to absorb energy from the moving wiper arms 14 and 16 at a position coinciding with the start of the increasing mechanical advantage region 60 and 62 shown in FIG. 2, a lost motion connection shown in FIG. 4 can be provided for the spring 70. In this aspect of the invention, the tab 72 on the pivot housing 26 has an elongated slot 80 formed thereon. The slot 80 movably receives one end of the spring 70. The dimensions of the spring 70 and the length of the slot 80 are chosen such that the first end of the spring 70 is disposed at a first end 82 of the slot 80 when the drive arm 46 is at the midwipe position. During movement of the drive arm 46 from the midwipe position to either of the outwipe or inwipe positions, the first end of the spring 70 will initially slide along the slot 80 and reach an opposed second end 84 of the slot 80 only when the drive arm 46 reaches an angular position coinciding with the beginning of one of the increased mechanical advantage regions 60 and 62. During such initial movement, there is no elongation of the spring 70 and, thus, no inertial energy absorption. However, engagement of the one end of the spring 70 with the second end 84 or the slot 80 will enable elongation of the spring 70 and an absorption or diversion of inertial energy from the wiper arm 14 to the spring 70.

Upon reversal of the wiper arm 14 at either of the inwipe or outwipe positions, the first end of the spring 70 will remain in engagement with the second end 84 of the slot 80 due to the extended nature of the spring 70 until the drive arm 46 reaches an angular position coinciding with the end of one region 60 or 62. At this position, the spring 70 is fully retracted to a neutral condition. Continued rotation of the drive arm 46 will cause the first end of the spring 70 to slide along the slot 80 to the opposite end 82, thereby preventing any further elongation of the spring 70 or energy absorption thereby.

Figure 5:
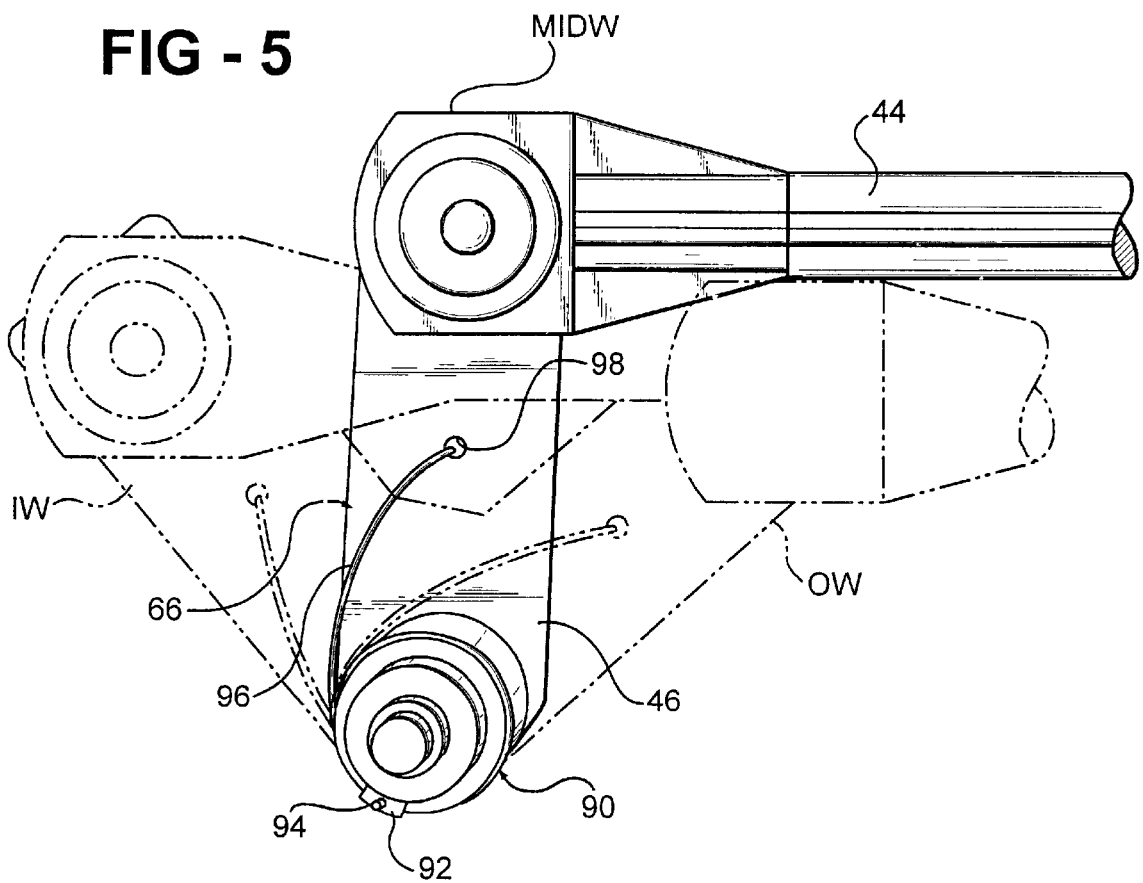
FIG. 5 is a rear elevational view of a second aspect of the inertial energy absorption apparatus of the present invention.
Figure 6:
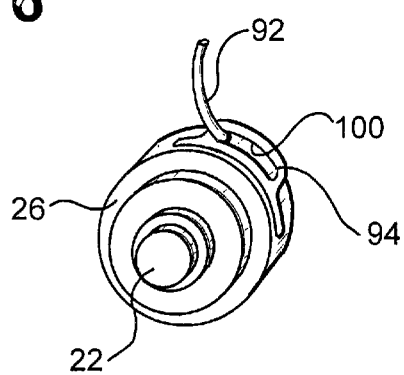
FIG. 6 is a partial view of a modification to the inertial energy absorption apparatus shown in FIG. 5.

FIGS. 5 and 6 depict another aspect of the energy absorption means 66 of the present invention. In this aspect, the energy absorption means 66 is in the form of a coil torsion spring 90 which is concentrically wound about a shaft portion of the pivot housing 26 which rotatably receives the pivot shaft 22. The coil torsion spring 90 has a first end 92 fixedly mounted in an aperture in a tab or projection 94 extending from the pivot housing 26, and an opposed second end 96 which is joined to the drive arm 46, such as by insertion through an aperture 98 in the drive arm 46. The spring 90 could also be mounted separate from the pivot housing 26 and the first end of the spring 90 connects to other stationary vehicle or wiper apparatus structure.

FIG. 5 depicts the position of the drive arm 46, the drive link 44, and the second end 96 of the coil spring 90 in solid at a midwipe position and in phantom at both the inwipe and outwipe positions.

Like the spring 70 in the embodiment shown in FIG. 3, the spring 90 is designed to have a low or zero spring force when the drive arm 46 is at the midwipe position. However, due to the different radii of rotation of the first end 92 and the second end 96 of the spring 90, pivotal movement of the drive arm 46 from the midwipe position to the outwipe position or from the midwipe position to the inwipe position will cause the coil spring 90 to windup thereby absorbing inertial energy from the drive arm 46, the drive link 44, and the wiper arm 14. This energy absorption gradually increases from a low or zero force absorption at the midwipe position of the drive arm 46 to maximum energy absorption at the full outwipe or inwipe position of the drive arm 46. The spring 90 also reapplies the stored energy to the drive arm 46 at the reversal point of travel of the wiper arm 14.

It is also possible to modify the connection of the first end 92 of the spring 90 so as to provide energy absorption only during the beginning half of each mechanical advantage region 60 and 62 as the drive arm 46 approaches the inwipe or outwipe positions. As in the aspect shown in FIG. 4, an elongated slot 100 is formed in the tab 94 on the pivot housing 26. The first end 92 of the spring 90 is hooked in the slot 100 and is capable of sliding movement between opposed ends of the slot 100. At the midwipe position, the first end 92 of the spring 90 is disposed at one end of the slot 100. As the drive arm 46 moves from the midwipe position to the outwipe position, for example, the first end 92 of the spring 90 moves within the slot 100 until it reaches the opposite end of the slot 100 and engages the surrounding structure of the tab 92 at an angular position of the drive arm 46 coinciding with the beginning of one of the mechanical advantage regions. As the drive arm 46 continues to pivot to the outwipe position, the spring 90 is now capable of absorbing energy since the first end 92 of the spring 90 is fixed in position in engagement with one end of the slot 100 on the tab 94. The dimensional arrangement of the tab 94 and slot 100 maintains the first end 92 of the spring 90 in engagement with one end of the slot 100 as the drive arm 46 reverses direction at the outwipe position and travels back toward the midwipe position. When the drive arm 46 reaches an angular position coinciding with the end of one of the regions 60 and 62, the first end 92 of the spring 90 begins to move along the slot 100 thereby preventing any energy absorption or energy reapplication by the drive arm 46.

Figure 7:
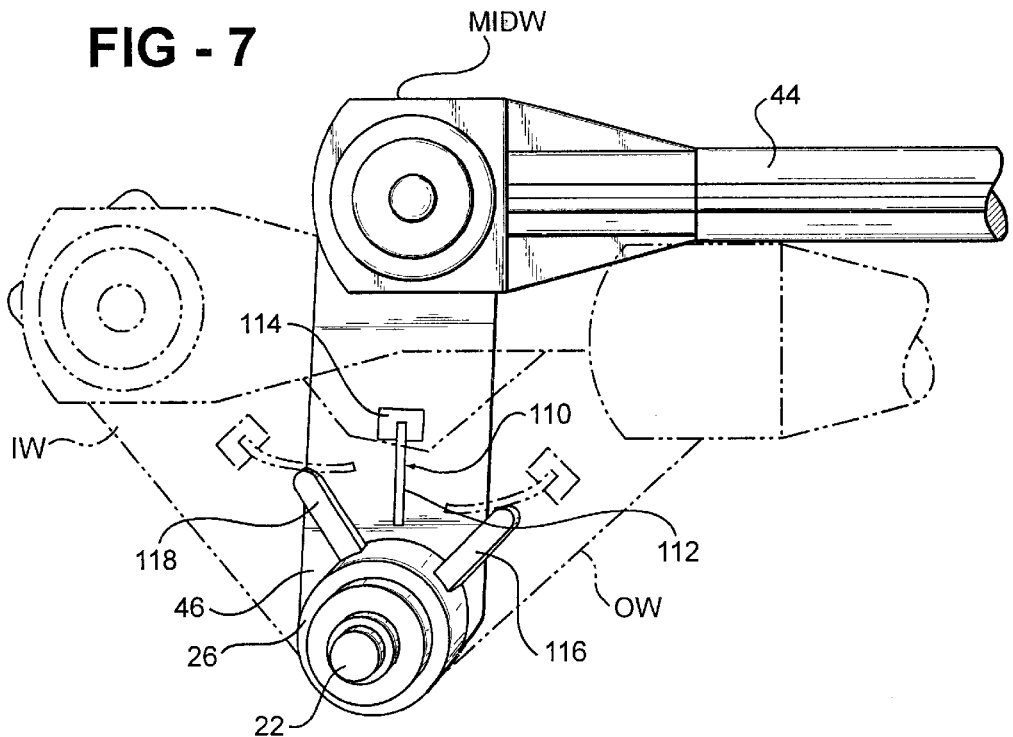
FIG. 7 is a rear elevational view of a third aspect of an inertial energy absorption apparatus according to the present invention.

FIG. 7 depicts yet another aspect of the energy absorption means of the present invention. In this aspect, a leaf spring 110 has a flexible leaf 112 fixedly mounted at one end in a support 114 on the drive arm 46.

The slot 100 could also be modified resembling a hook which is positioned to engage the first end of the spring 92 at an angular position of the drive arm 46 corresponding to the beginning of one of the mechanical advantage regions 60 or 62.

The opposite end of the leaf 112 is capable of flexing as shown in FIG. 7. An elongated arm 116 projects from the pivot housing 26 and is positioned on the pivot housing 26 to engage the leaf 112 only as the drive arm 46 approaches the outwipe limit. Flexure of the leaf 112 causes the leaf spring 110 to absorb energy thereby diverting a portion of the inertial energy from the wiper arm 14 and preventing expansion of the wipe pattern 18 beyond the nominal outwipe limit of the wipe pattern 18. After the wiper blade 14 reverses direction and the drive arm 46 rotates counterclockwise in the orientation shown in FIG. 7 toward the inwipe position, the leaf spring 110 will gradually relax and reapply the stored energy to the drive arm 46, the drive link 44, and the wiper arm 14 facilitating movement thereof.

As shown in solid in FIG. 7, when the drive arm 46 reaches the midwipe position, the leaf 112 of the leaf spring 110 is essentially straight and in a relaxed, zero spring force position.

If it is desired to provide energy absorption as the drive arm 46 approaches the inwipe limit, a second arm 118 may also be provided on the pivot housing 26 angularly spaced from the arm 116 and disposed so as to engage and flex the leaf 112 of the leaf spring 110 in the same manner as described above, but only as the drive arm 46 approaches the inwipe limit. After reversal of the travel direction of the wiper arm 14 and the beginning of travel of the wiper arm 14 toward the outwipe limit, the energy stored in leaf spring 110 is reapplied to the drive arm 46 to facilitate the acceleration of the drive arm 46.

For both inwipe and outwipe energy absorption, the angular position of the arms 116 and/or 118 are selected so that each arm 116 and 118 engages the leaf spring 110 when the angular position of the drive arm 46 reaches the beginning portion of one of the mechanical advantage regions 60 or 62. In this manner, angular rotation of the drive arm 46 from the midwipe position shown in solid in FIG. 7 to an angular position coinciding with the beginning with one of the mechanical advantage regions 60 and 62 at which time the projection 116 or 118 engages the leaf spring 110 is a region of no energy absorption. In this manner, energy absorption is applied only during the portion of increasing mechanical advantage in the drive linkage.

Although two arms 116 and 118 are shown in FIG. 7 to provide energy absorption as the drive arm 46 approaches both of the outwipe and inwipe positions, it is also possible to provide only one of the arms 116 or 118 if energy absorption is required, due to wiper design and space requirements, at either the inwipe or outwipe position.

Figure 8:
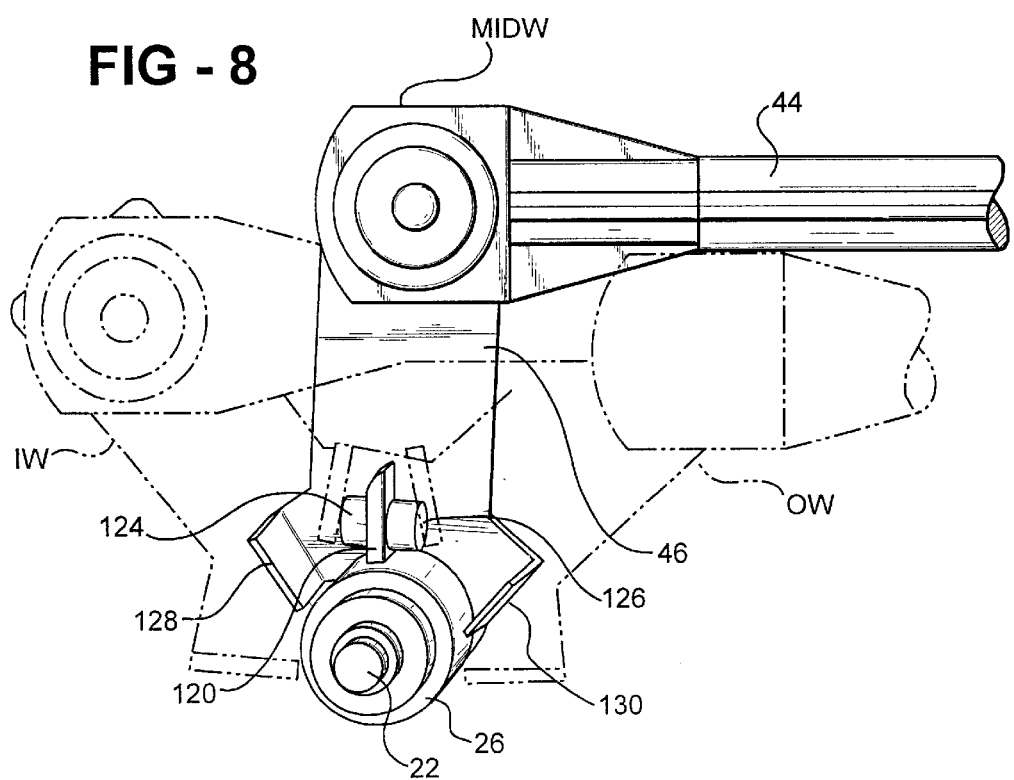
FIG. 8 is a rear elevational view of a fourth aspect of an inertial energy absorption apparatus according to the present invention.

Yet another aspect of the present invention is shown in FIG. 8. In this aspect of the invention, an arm 120 extends stationary vehicle or wiper apparatus structure, such as from the pivot housing 26. A resilient member 122, such as a tubular member formed of a resilient elastomer, is fixedly mounted in the arm 120 and has, by way of example only, a first end 124 projecting from one side of the arm 120 and an opposed second end 126 projecting from an opposite side of the arm 120.

An upstanding flange 128 is formed along one edge of the drive arm 46. The dimensional relationship between the flange 128 and the first end 124 of the resilient member 122 is chosen so that the flange 128 engages as the drive arm 46 reaches an angular position corresponding to the beginning of one of the mechanical advantage regions 60 or 62 and gradually compresses the first end portion 124 of the resilient member 122. Upon further angular rotation toward one of the inwipe or outwipe positions. This compression stores energy in the resilient member 122 and diverts a portion of the inertial energy of the wiper arm 14 from the wiper arm 14 to minimize expansion of the wipe pattern 18 at the outwipe position. This stored energy is released back to the wiper arm 14 through the drive arm 46 and the drive link 44 after reversal of the travel direction of the wiper arm 14 and as the drive arm 46 begins counterclockwise rotation in the orientation shown in FIG. 8 toward the inwipe position.

Separate inwipe energy absorption may also be provided by providing a second upstanding flange 130 on an opposite edge of the drive arm 46. The flange 130 is positioned to engage the second end 126 of the resilient member 122 only as the drive arm 46 approaches the inwipe position. The flange 130 gradually compresses the second end 126 of the resilient member 122 storing energy in the resilient member 122. This stored energy is again reapplied to the wiper arm 14 through the drive arm 46 and the drive link 44 after reversal of the travel direction of the drive arm 46 at the inwipe position.

It is also feasible, within the scope of the present invention to reverse the resilient member 122 and arm 120 in the flanges 128 and 130 on the drive arm 46 by placing the resilient member 122 and arm or support 120 on the drive arm 46 and the flanges 128 and 130 projecting in an angularly spaced manner on the pivot housing 26.

In the above embodiments, the energy absorption means shown in FIGS. 3–6 is devised solely for bidirectional energy absorption at both of the inwipe and outwipe positions. The embodiments shown in FIGS. 7 and 8, on the other hand, are devised for either bidirectional energy absorption at each of the inwipe and outwipe positions or separate and unidirectional energy absorption at only one of the inwipe and outwipe positions. This enables the energy absorption of the present invention to be tailored to the particular design requirements of a windshield application.

In summary, there has been disclosed a unique energy absorption means which is coupled an element of a windshield wiper apparatus and is operative to absorb and divert a portion of the inertial energy of the moving wiper arm and linkage as the wiper arm approaches at least one of the outwipe travel position and/or the inwipe travel position to prevent expansion of the wipe pattern at the outwipe and/or inwipe positions. The energy absorption means is embodied in different spring or compression members, each of which is capable of absorbing energy and then reapplying the absorbed energy back to the wiper drive system to facilitate acceleration of the wiper arm at the point of reversal of the travel direction of the wiper arm.

What is claimed is:

1. A windshield wiper apparatus for a vehicle comprising:
   a pivot housing fixed to the vehicle;
   a pivot shaft carried within the pivot housing and capable of rotation about the longitudinal axis over a predetermined angle corresponding to the wipe pattern;
   a wiper arm rotatably mounted on the pivot shaft and movable in wipe pattern between an inwipe end limit and an outwipe end limit;
   a drive motor having a drive shaft rotatable about a drive axis;
   a crank arm coupled at one end to the motor drive shaft for rotation with the drive shaft;
   a drive link having a first end pivotally connected to a drive arm and a second end coupled to the crank arm for bidirectional oscillation in response to rotation of the crank arm;
   the drive arm fixedly connected at one end to the pivot shaft for bidirectional rotation of the pivot shaft in response to oscillation of the drive link; and
   energy absorption means, coupled to the drive arm at one end and to fixed stationary structure at an opposite end, for storing a portion of the inertial energy of the moving wiper arm as the wiper arm moves toward the inwipe end limit and the outwipe end limit with an energy-absorption-free zone defined over a substantial portion of the predetermined angle of rotation between the end limits of the wipe pattern.

2. The apparatus of claim 1 wherein the energy absorption means comprises:
   spring means connected between the drive arm at the one end and an aperture formed in the fixed structure at the opposite end for storing energy as the wiper arm approaches both of the inwipe end limit and the outwipe end limit.

3. The apparatus of claim 2 wherein the spring means comprises:
   an extension spring connected between the drive arm at the one end and an aperture formed in the fixed structure at the opposite end.

4. The apparatus of claim 3 wherein the tension spring extends as the wiper arm approaches the inwipe and outwipe end limits.

5. The apparatus of claim 2 wherein the spring means comprises:
   a coil tension spring concentrically mounted about the pivot housing and having first and second ends, the first end connected to the drive arm and the second end connected to an aperture formed in the fixed structure.

6. The apparatus of claim 2 wherein the spring means comprises:
   a leaf spring fixed at a first end to the drive link and having a freely movable second end opposed from the first end;
   and the energy absorption means further including a projection extending from the pivot housing, the projection engaging and bending the second end of the leaf spring as the wiper arm approaches one of the end limits in the leaf spring.

7. The apparatus of claim 2 wherein one end of the spring means is disposed in an elongate closed ended slot and movable between first and second ends of the slot during movement of the drive arm along a portion of the travel of the wiper arm between the inwipe end limit and the outwipe end limit to decouple the spring means from energy absorption for a corresponding portion of the angular navel of the drive arm.

8. The apparatus of claim 7 wherein the one end of the spring means engages one of the first and second ends of the slot after the drive arm has traveled past a predetermine angular position with respect to one of the end limits, the engagement of the first end of the spring means with one of the first and second ends of the slot initiating the absorption of energy in the spring means.

9. The apparatus of claim 1 wherein the energy absorption means comprises:
   a compressible member mounted on the pivot housing and having at least a first end; and
   a flange carried on the drive arm, the flange engaging the first end and compressing the compressible member to store energy in the compressible member as the drive arm approaches one of the inwipe and outwipe end limits.

10. The apparatus of claim 1 wherein the energy absorption means stores energy only when the wiper arm approaches one of the end limits.

11. The apparatus of claim 1 wherein the energy absorption means is operative at each of the inwipe end limit and the outwipe end limit.

12. The apparatus of claim 1 wherein the energy absorption means releases the absorbed energy to the wiper arm and the drive arm as the wiper arm begins movement from one end limit toward the other end limit.

13. The apparatus of claim 1 further comprising:
    means for engagably coupling the energy absorption means to the drive arm only during a predetermined angular rotational movement of the drive arm, wherein the coupling means includes an elongate closed ended aperture formed in the fixed structure.

14. A method of storing at least a portion of the inertial energy of a moving wiper arm in a vehicle windshield wiper apparatus as the wiper arm moves in a wipe pattern between an inwipe end limit and an outwipe end limit, the windshield wiper apparatus having a pivot housing fixed to the vehicle, a pivot shaft carried in the pivot housing and capable of rotation about the longitudinal axis over a predetermined angle corresponding to a wipe pattern, a drive motor having a drive shaft rotatable about a drive axis, a crank arm fixed at one end to the drive shaft for rotation with the drive shaft, a drive link having a first end pivotally connected to a drive arm and a second end oscillatingly connected to the crank arm for bidirectional oscillation in response to rotation of the crank arm, the drive arm fixedly connected at one end to the pivot shaft for bidirectional rotation of the pivot shaft in response to oscillation of the drive link and the drive arm, the method comprising the steps of:
    coupling an energy absorption means to the drive arm at one end and to fixed stationary structure at an opposite end for storing at least a portion of the inertial energy of the moving wiper arm as the moving wiper arm moves toward an inwipe end limit and an outwipe end limit in the wipe pattern with an energy-absorption-free zone defined over a substantial portion of the predetermined angle of rotation between the end limits of the wipe pattern.

15. The method of claim 14 further comprising the step of:
    releasing the absorbed energy in the energy absorption means after the wiper arm has reversed direction of movement toward the other of the inwipe end limit and the outwipe end limit.

16. The method of claim 14 further comprising the step of:

connecting the energy absorption means to the drive arm at the one end and to an aperture formed in the fixed structure at the opposite end so that the energy storage means is operative to store energy only as the wiper arm approaches one of the inwipe end limit and the outwipe end limit.

17. The method of claim 14 further comprising the step of:

coupling the energy storage means between the drive arm at the one end and to an aperture formed in the pivot housing at the opposite end for storage of inertial energy as the wiper arm approaches each of the inwipe end limit and the outwipe end limit.

18. The method of claim 14 further comprising the step of:

forming the energy absorption means as a spring.

19. The method of claim 14 further comprising the step of:

forming the energy absorption means as a compressible member.

20. The method of claim 14 wherein the step of coupling an energy absorption means to the drive arm further comprises the step of:

actively coupling the energy absorption means to the drive arm at the one end and to an elongate closed ended slot formed in the fixed suture at the opposite end for energy storage in the energy absorption means only during predetermined angular rotational positions of the drive arm corresponding to engagement of the opposite end of the energy absorption means with a corresponding end of the elongate slot.

* * * * *

UNITED STATES PATENT AND TRADEMARK OFFICE
CERTIFICATE OF CORRECTION

PATENT NO.     : 6,393,653 B1
DATED          : May 28, 2002
INVENTOR(S)    : Daryl G. Harris, Robert K. Arao and Thomas A. Gibson It is certified that error appears in the above-identified patent and that said Letters Patent is hereby corrected as shown below:

Column 11,
Line 50, claim reference numeral "2" should read -- 1 --, and "spring" should read -- energy absorbing --.
Line 52, "link" should read -- arm --.

Signed and Sealed this

Fifth Day of November, 2002

Attest:

Attesting Officer

JAMES E. ROGAN
Director of the United States Patent and Trademark Office